June 29, 1965 W. W. SULLIVAN 3,192,521

SHAFT ENCODERS

Filed March 10, 1961 3 Sheets-Sheet 1

Warren Walter Sullivan
INVENTOR.

BY Michael P. Breston

June 29, 1965 W. W. SULLIVAN 3,192,521

SHAFT ENCODERS

Filed March 10, 1961 3 Sheets-Sheet 2

Warren Walter Sullivan
INVENTOR.

BY Michael P. Breston

Warren Walter Sullivan
INVENTOR.

BY Michael P. Breston

United States Patent Office 3,192,521

Patented June 29, 1965

3,192,521

SHAFT ENCODERS

Warren Walter Sullivan, Alexandria, Va., assignor to Electro-Mechanical Research, Inc., Sarasota, Fla., a corporation of Connecticut Filed Mar. 10, 1961, Ser. No. 94,846
11 Claims. (Cl. 340—347)

This invention generally relates to shaft position encoders and more particularly to new and improved magnetic shaft position digital encoders for producing coded electrical signals representative of discrete positions of a member or shaft.

This application is a continuation-in-part of copending application Serial No. 852,542, filed November 12, 1959, now Patent No. 3,113,300, by the same inventor.

By accurately translating mechanical motion into sets of two-level electrical signals which represent the digits of numbers corresponding to discrete positions of a movable member, position encoders have rapidly become a vital link of communication between mechanical apparatus and digital handling systems. Basically, digital shaft position encoders include two principal parts: a coded member and a device for reading out the code on the member. Either the member or the device is fixedly keyed to a shaft for rotation therewith.

One type of shaft position encoders, known as "variable reluctance encoders," includes a rotatable member of ferro-magnetic material (e.g., soft iron), such as a disk or drum secured to the shaft, and a plurality of variable reluctance pickup devices. For example, one side of the rotatable member may bear a number of tracks, each consisting of elevated and depressed areas arranged in accordance with a suitable code pattern. In another known type of variable reluctance shaft position encoders, the rotatable member carries on one side a plurality of soft iron segments arranged in a number of tracks forming a code pattern.

In either type of such encoders, a single variable reluctance pickup device is disposed adjacent each track for reading the code. The pickup device typically includes a large laminated core of magnetic material having an air gap, and at least one winding around the core. The operation of the variable reluctance type encoder is based upon changes in the reluctance of the air gap of the core resulting from the relative motion of the rotatable member with respect to the variable reluctance pickup device. Thus, when an elevated area of the magnetic material, or a magnetic segment, is directly adjacent to the air gap of the core, the reluctance of the air gap decreases and, conversely, when a depressed area, or when no segment is directly adjacent to the air gap of the core, the reluctance of the air gap increases. The variations in the reluctance of the air gap produce corresponding amplitude variations in a signal existing in the winding on the core.

Variable reluctance digital position encoders and other similar types are known to have many disadvantages, some of which are the following:

(1) The amplitude of the signals in the output winding on the core depends upon the rate of relative motion between the code carrying member and the pickup device. Therefore, to obtain useable signal levels, this relative motion must be at a predetermined rate;

(2) Since the amplitude of the output signals depends upon the reluctance of the core air gap, the spacing clearances between the pickup devices and the code carrying member are critcal. Therefore, any clearance variations produce erroneous output intelligence signals;

(3) Since the cores of the variable reluctance pickup devices do not afford closed magnetic circuits, such as are provided by gapless toroids, the laminated core material of each pickup must be of substantial volume and the output winding, to produce noticeable amplitude variations, must have a relatively great number of turns, thereby necessitating the use of code carrying members of large surface area and reducing the number of heads which may be placed adjacent to a given surface area of the disk.

These disadvantages of the variable reluctance encoders greatly reduce the accuracy and the resolution with which displacements of the shaft may be encoded.

In the aforementioned copending application, there is provided a new ON-and-OFF saturation type magnetic shaft position digital encoder which substantially eliminates the inherent complexity and unreliability generally associated with variable reluctance type encoders. This new magnetic encoder includes a rotatable disk having on an end face thereof one or more concentric coded tracks, each comprising a predetermined number of permanently magnetized areas or spots. The disk is made of a magnetic material, such as barium ferrite, having a magnetic permeability substantially equal to that of air. The disk is permanently spot magnetized in accordance with a binary code or other code with a radix of two. Magnetic flux lines emanate substantially perpendicularly to the face of the disk to saturate a miniature ferromagnetic toroidal core when adjacent to a magnetized spot, thereby preventing the miniature gapless core from switching in response to an alternating excitation signal applied to a winding on the core, from one remanent saturation state to the opposite remanent saturation state along a substantially square-type hysteresis curve.

High precision shaft position encoders must resolve the angular shaft displacements into as many sets of digits or numbers as possible, each number representing a discrete shaft position. For example, when only five-digit signals are used to quantize or define the shaft position, the angular resolution may be $360°/2^5=11.25°$, which is a relatively coarse resolution of the angular position of the shaft. On the other hand, an encoder with a fifteen-digit code affords an angular resolution of $360°/2^{15}=0.011°$, which is one part in 32,768. A fifteen-digit encoder would, for example, require fifteen distinct coded tracks on the face of the disk. Unless the disk has a face of large surface area, fifteen coded tracks on the face of the disk would produce inter-track cross-talk which would prevent an accurate reading of the coded disk. If large diameter disks are employed, the position encoders present an appreciable moment of inertia and require a relatively high starting torque.

Accordingly, it is an object of this invention to provide new and improved magnetic digital position encoders giving a high shaft resolution yet employing very small diameter disks.

It is another object of the present invention to provide new and improved magnetic shaft position encoders which efficiently utilize the surface area of each disk.

It is still another object of the present invention to provide high resolution magnetic shaft position digital encoders in which inter-track cross-talk is completely eliminated.

Other objects of the present invention are to provide high-precision digital magnetic shaft position encoders which are especially suitable for high speed operation, which provide unambiguous readings independent of the speed of the shaft over their entire operating range, which can withstand severe physical environmental conditions such as high temperature, pressure, shock, radiation, and extraneous magnetic fields, which require a very low starting torque, and which include a minimum of contacting and moving parts for affording minimum wear and maximum reliability.

These and other apparent objects of the present invention are accomplished by providing magnetic shaft position digital encoders with two or more magnetic disks. Each disk is rotatably supported by a shaft and preferably has, on each face thereof, a plurality of coded, permanently spot-magnetized tracks affording a high resolution with a minimum of small diameter disks. Miniature ferromagnetic toroidal cores are provided for sensing the magnetized spots or areas of each track. A precision speed reducing gearing mechanism is provided for coupling one shaft to the other and thus one disk to the other.

Other objects and advantages of the present invention will become apparent from the following detailed description when considered in conjunction with the accompanying drawings in which.

Figures 1, 2, 3:
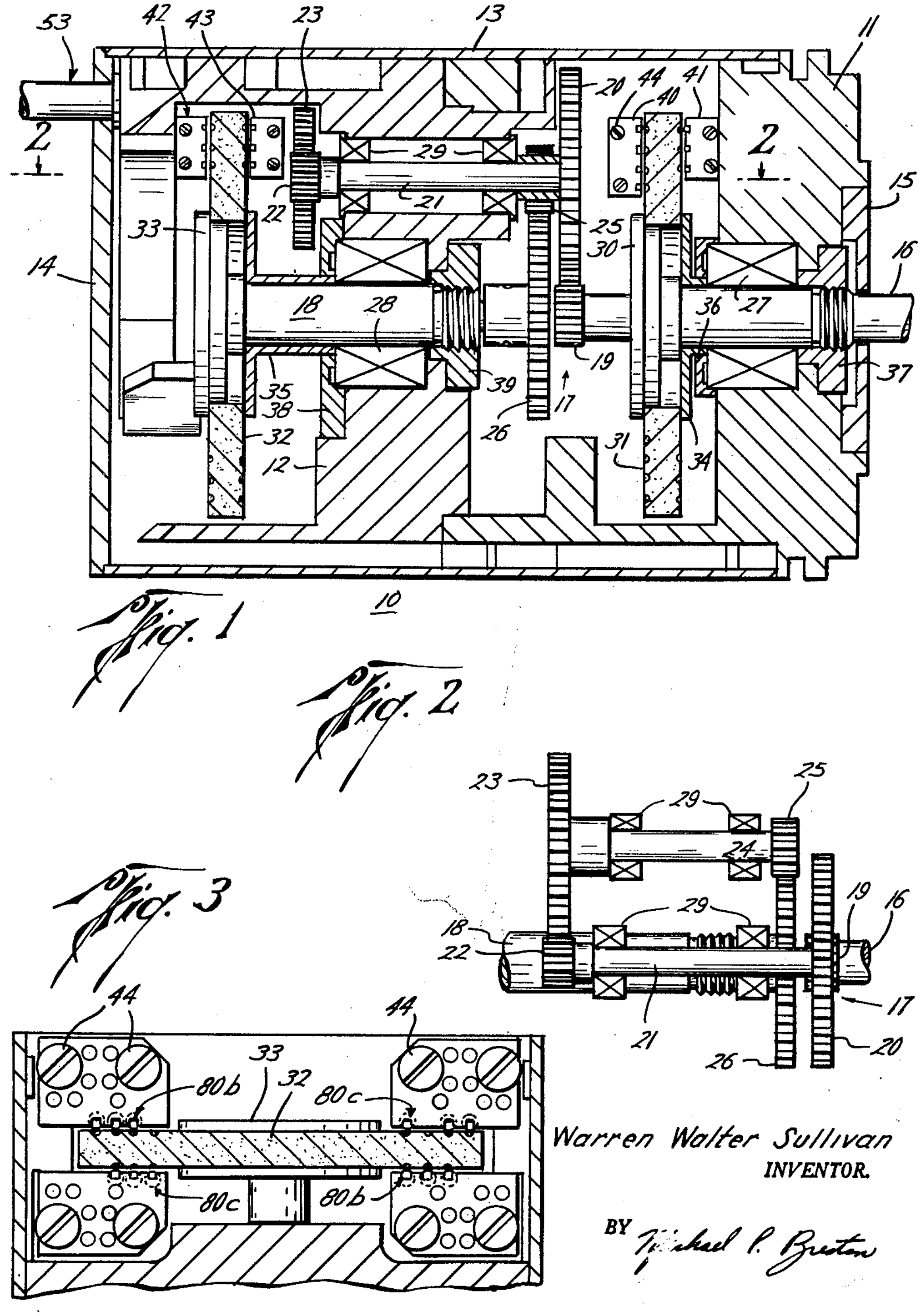
FIG. 1 is a longitudinal vertical sectional view taken through the shaft position encoder of the present invention.
FIG. 2 is a partial elevational view taken on line 2—2 of FIG. 1, to illustrate the encoder gear train.
FIG. 3 is a partial side elevation view of the secondary magnetic disk of FIG. 1 when provided with four core carrying boards.

A preferred embodiment of a double disk thirteen-bit magnetic digital shaft position encoder 10, for encoding the position of an input shaft, is shown in FIGS. 1 and 2. It comprises a primary housing 11 and a secondary housing 12. A cylindrical cover sleeve 13, longitudinally extending from one end of housing 11 to the other end of housing 12, and two circular cover plates 14 and 15 enclose the housings and shield the inner space therein from dust. The housings, the sleeve, and the cover plates are preferably made out of a light non-magnetic material such as aluminum.

A fast driving shaft 16, one end of which protrudes through a central opening in the end cover 15, is coupled at its other end by a spur-gear speed reducer 17 to a low-speed driven shaft 18. The speed reducer 17 comprises a high-speed pinion 19, meshed to a first idler gear 20, which is keyed to a first intermediate shaft 21, for driving a pinion 22, in turn meshed to a second idler gear 23, which is keyed to a second intermediate shaft 24, for driving a small gear 25, meshed to a larger gear 26, which is keyed onto slow-speed shaft 18. The spur-gear reducer 17 is very compact and efficiently couples the motion of driving shaft 16 to drive shaft 18 in a straight line. The number of teeth on each spur gear is chosen in dependence upon the desired degree of resolution. For the illustrated thirteen-digit encoder, the preferred gear ratio is 64:1. Respective duplex bearings 27 and 28 rotatably (with respect to housings 11 and 12) support shafts 16 and 18 in a cantilever manner. Intermediate shafts 21 and 24 are rotatably supported at their opposite ends by a set of bearings 29.

Shaft 16 has a protruding annular flange 30 for supporting an annular magnetic wheel or disk 31. Similarly, shaft 18 has an outer flange 33 for supporting a secondary annular magnetic disk 32. Disk 31 is fixedly attached to the hub of shaft 16 by a clamp 34 and disk 32 is fixedly attached to the hub of shaft 18 by a clamp 35. By preloading bearings 27 and 28 against their corresponding bearing retainers 36 and 38 with the aid of the respective tightening nuts 37 and 39, threaded onto the respective shafts 16 and 18, the disks, the clamps, and the bearings become fixedly secured with respect to housings 11 and 12. The shafts, bearings, and tightening nuts are preferably made of non-magnetic stainless steel.

To read out the information contained on each face of the disk, there are provided four mounting boards 40–43, one for each face of each disk, and each board carries as many pickup heads (toroids) as there are tracks on its corresponding face. The mounting boards are preferably made out of a laminated plastic material and are secured to the respective housings by screws 44.

Figure 5:
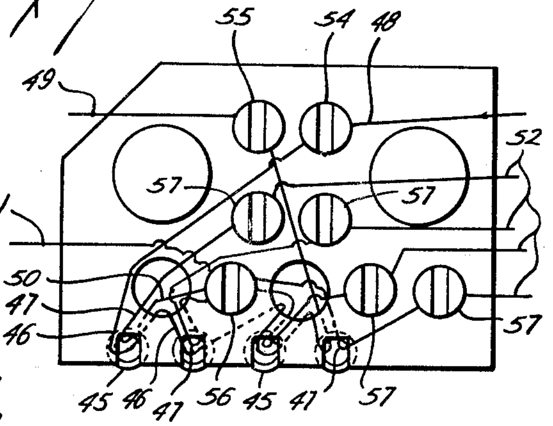
FIG. 5 is a plan view of a typical core mounting board.

As shown in greater detail in FIG. 5, a plurality of small notches are cut out of one edge of each mounting board. Oppositely to each notch is bounded, by a suitable adhesive, a ferromagnetic miniature toroidal core 45 carrying a single or multiple turn interrogating winding 46 and a multi-turn output or readout winding 47. (To simplify the drawing, windings 46 and 47 are represented in FIG. 5 as single-turn windings.) In one embodiment of the invention, all interrogating windings 46 were connected in series with two input wires 48 and 49. One lead 50 of each output winding 47 was connected to a common bus wire 51, the other lead 52 of each output winding carried the output digit signals of the winding. Each signal carrying lead 52, the two input wires 48 and 49, and the common wire 51 formed a cable 53 which extended through an opening in the left-hand cover 14. The input wire 48 is secured to terminal lug 54 from which it comes out to form a single or multiple turn winding 46 around each core, as shown. Then, wire 48 is clamped to wire 49 at a terminal lug 55. Thus, when a signal is applied across wires 48 and 49 all the cores 45 are interrogated in series. The common wire 50 of each readout winding 47 is connected to a terminal pin 56. Each signal carrying lead 52 is secured to a separate terminal lug 57. The remaining mounting boards (except for the number of toroids) are similarly wired. Each board is fastened to its corresponding housing in such a manner that a toroid is adjacent to each track.

Disks 31 and 32 are formed of a high coercivity material, an example of which is barium ferrite. Unoriented (i.e., where the molecules have not been aligned by a strong field applied to the material during the firing stage) barium ferrite, commercially available under such trade names as Indox No. 1 (manufactured by the Indiana Steel Company) and Ceramag (manufactured by the Stockpole Carbon Company), is a homogeneous material, extremely brittle, and very hard. Its magnetic permeability is substantially equal to that of air. Each disk is permanently magnetized by subjecting it to an intense, concentrated magnetic field in the area to be magnetized, for example, by the use of a pointed electromagnet energized by a direct current. The magnetized areas may be as small as .02 inch in diameter or less, and, if adjacent spots are of the same magnetic polarity, the spacing between the spots may be of the same order as the diameter of a spot. It has been found that more than 50 discrete areas per linear inch may be permanently magnetized on the face of a barium ferrite disk, permitting a greater resolution than $\frac{1}{50}$ of an inch with the encoder of FIG. 1. It has also been found that by suitably controlling the energizing ampere-turns of the electromagnet, the permanent magnetization will be confined to the outer layer of the disk, hence, permitting the magnetization of both faces of a relatively thin disk. The magnetized spots, once applied to the surface of the disk, are very stable, permanent, and will not demagnetize under relatively high temperature, shock, vibration and external demagnetization fields.

Preferably then, the disk material employed should have a high retentivity (a high ratio of residual flux density to maximum flux density) and a high coercivity (a high ratio of coercive force to magnetic field intensity required for saturation); barium ferrite has both of these qualities. In sum, the main advantages derived from using a high coercivity and a high retentivity material are: to enable permanent minute spot magnetization of the face of the disk and to localize the spot magnetization to the outer layers of the disk. In addition, if the material also has a relative permeability substantially equal to that of air, the flux lines emanating from each magnetized spot will extend substantially perpendicularly to the face of the disk, thereby greatly facilitating the saturation of the miniature toroidal cores. The latter advantage will become more apparent as the description proceeds.

Figure 4:
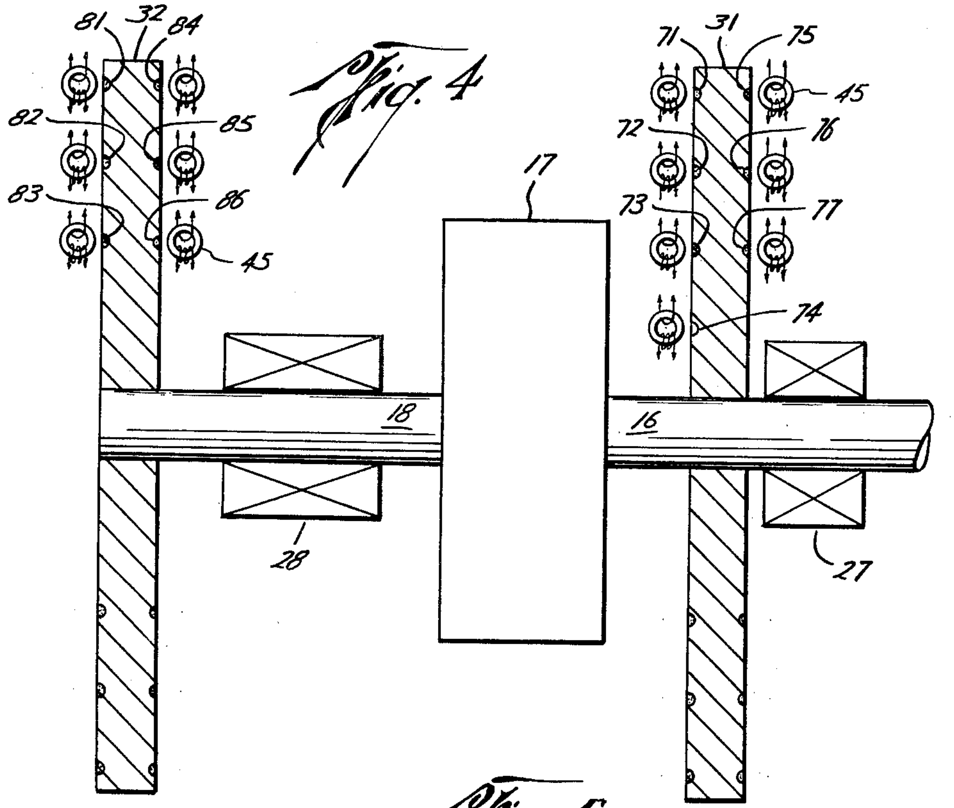
FIG. 4 is a schematic representation of the double disk encoder of FIG. 1.
Figure 7:
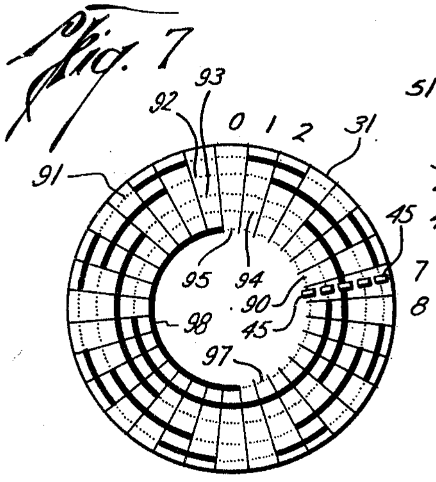
FIG. 7 illustrates schematically an alternative binary code pattern for the primary magnetic disk.

To encode the position of the shafts or disks, each face of each disk carries a plurality of permanently magnetized spots represented in FIG. 7 as dotted arcuate segments arranged to form a code pattern, preferably of binary form. For the thirteen-digit shaft position encoder of FIG. 1, the left hand face of disk 31 carries four magnetic concentric rings or tracks 71–74, shown in cross-section in FIGS. 1 and 4 as dotted semicircles and, on its right hand face, three additional rings 75–77. Disk 31 is therefore a seven-digit disk, track 71 being the first (finest track) and track 77 being the last (coarsest) track. Similarly, disk 32 has on its left hand face three magnetic rings 81–83 and, on its right hand face, three additional rings 84–86. Hence, disk 32 is a six-bit disk which, together with disk 31, forms a thirteen-bit encoder providing thirteen simultaneous digit signals for each binary number representative of a discrete shaft position.

To better explain the coding of each disk, reference is made to FIG. 7. Assume for the moment (to simplify the drawings) that disk 31 is for a five-digit code and of the form illustrated which represents the pattern of a cyclic ("Gray") code. The circle of the disk is divided into thirty-two discrete or quantized sectors. The number of sectors into which the circle is divided is, in general, $2^n$, where $n$ is the number of digits (rings or tracks) employed. The five rings of FIG. 7 are preferably arranged as shown so that the coarsest (last) ring is the innermost and so on to the first or finest ring, which is the outermost. Each ring or track is segmented into a plurality of magnetized arcuate segments or areas (represented as dotted arcs) and an equal number of unmagnetized arcuate segments (represented as heavy black arcs).

The digit signals developed in the output windings on the five radially aligned toroids, depicted as small rectangles, one toroid (head) associated with each track, are two level ON or OFF signals which are generally referred to as binary signal digits "1" or "0." The reference position from which the angle is measured is numbered as the sector 0. The rotation of the shaft to which the code wheel is fixedly secured may be represented by any desired function of time: the disk may be stationary or rapidly accelerating or decelerating in a clockwise or counter clockwise direction. If the shaft position is such that the pickup units fall within the seventh sector, the parallel output digit signals which are simultaneously generated are, in cyclic binary ("Gray") terms, "00100." If the relative displacement of the wheel and the pickup heads is such that the next consecutive eighth sector is under the pickup heads, the digit signal output would become, in cyclic binary terms, "00110."

In the illustrated example, only five-digit signals quantize the shaft position within an angle of $360°/2^5=11.25°$, which is a relatively coarse resolution of the angular position of the shaft. A six-digit disk would provide a resolution of 5.62°, and a seven-digit disk would afford a resolution within a sector of 2.81°. The resolution of a thirteen-digit encoder is one part in 8,192, or within a sector of 4.044°.

Since, as mentioned previously, it has been found possible to magnetize both faces of each disk without causing magnetic interference between the code tracks of opposite sides, when small disks are employed some inner rings are conveniently placed on the opposite face of the disk.

In the illustrated elementary code pattern of FIG. 7, disk 31 carried only five tracks. As can be seen from FIGS. 1 and 4, disk 31 carries 7 tracks. Thus, instead of permanently magnetizing one side of disk 31 into seven concentric tracks, the first four outer tracks 71–74 are magnetized on the left hand side of the disk, and the remaining three inner tracks 75–77 are placed on the right hand side. Similarly, in the six-digit disk 32, the first outer three tracks 81–83 are placed on the left hand side and the remaining three inner tracks 84–86 are placed on the right hand side. The number of rings carried on either side of the disk is arbitrary; for convenience, the rings are equally divided. It will be appreciated that the inner rings may be placed on the opposite face of the disk on different diameter circles.

It will also be apparent, from the description given in conjunction with the elementary code pattern shown in FIG. 7, that for the seven-bit disk 31 the circle is divided into 128 sectors, whereas for the 6-bit disk 32 it is divided into 64 sectors. Since the speed reduction between shafts 16 and 18 is 64:1, the disk 32 will rotate 1 sector for every 128 sectors of disk 31, in other words, disk 32 will rotate 1 sector for every complete revolution of disk 31.

Figure 6:
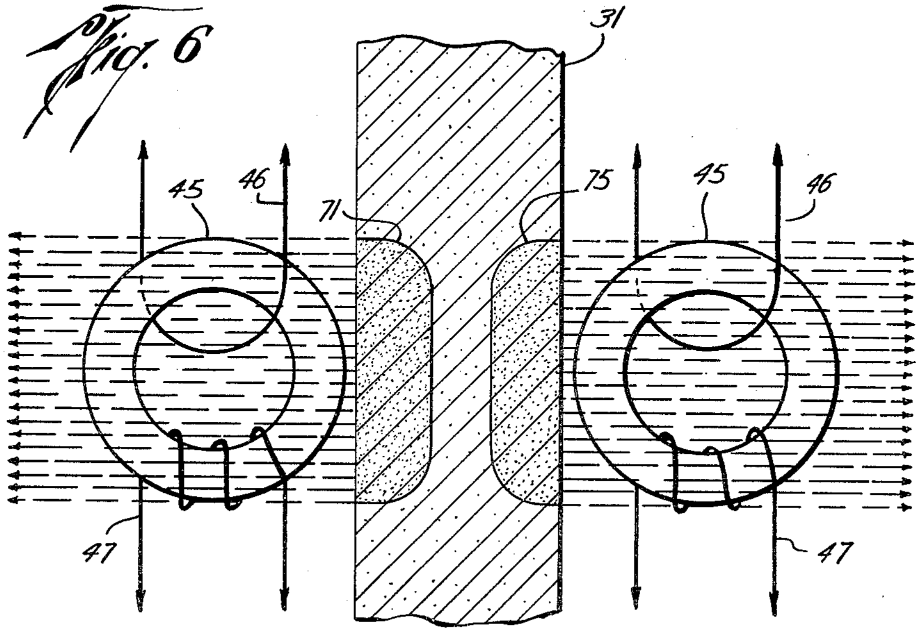
FIG. 6 is an enlarged cross sectional view of a magnetic disk with two oppositely spaced pickup heads, illustrating the paths of the magnetic flux lines emanating from the magnetized spots.
Figure 9:
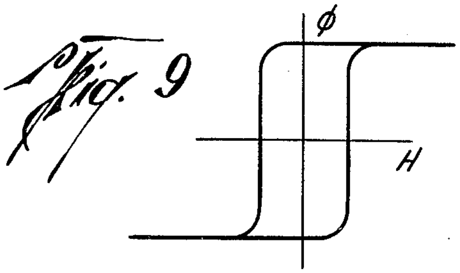
FIG. 9 is a preferred hysteresis curve of magnetic toroidal cores for use with the encoder of FIG. 1.

As shown in the enlarged view of FIG. 6, the re-entrant miniature magnetic cores 45, employed to sense the presence of the magnetic spots, have dimensions of the same order as the dimensions of the smallest magnetized area. Toroidal re-entrant cores made of a ferromagnetic material having an outside diameter of 0.050 inch, an internal diameter of 0.030 inch and a thickness of 0.015 inch have been employed, and such cores have been spaced approximately 0.003 inch from the face of the disk. Since the flux emanating from each magnetized spot is sufficient to saturate the core, the spacing is not critical and it may have relatively wide plus or minus tolerances. The magnetic cores which are preferred for the apparatus of the invention are saturable cores exhibiting a "square loop" hysteresis curve as shown in FIG. 9. Preferably, each core is of a material which is saturable by the flux lines emanating from the smallest magnetized spot when adjacent thereto.

The number of turns on each winding depends upon the operating conditions, such as the frequency of the interrogating signal, the magnetic characteristics of the cores, the magnitude of the readout signal desired, the circuits employed for readout, etc. In a preferred embodiment of the invention, each input winding 46 consisted of a single turn of No. 36 wire, and each output winding 47 consisted of 22 turns of No. 40 wire. When a 500 milliampere alternating current having a frequency in the range of 40 kc. to 200 kc. is applied to an interrogate winding, an approximately one volt peak-to-peak output signal is obtained from the read winding 47 when no magnetized area is immediately adjacent to the core, and a 50 to 60 millivolt output signal is obtained when a magnetized area is opposite to the core, thus providing binary ON and OFF digit signals having a ratio greater than 10.

Figure 8:
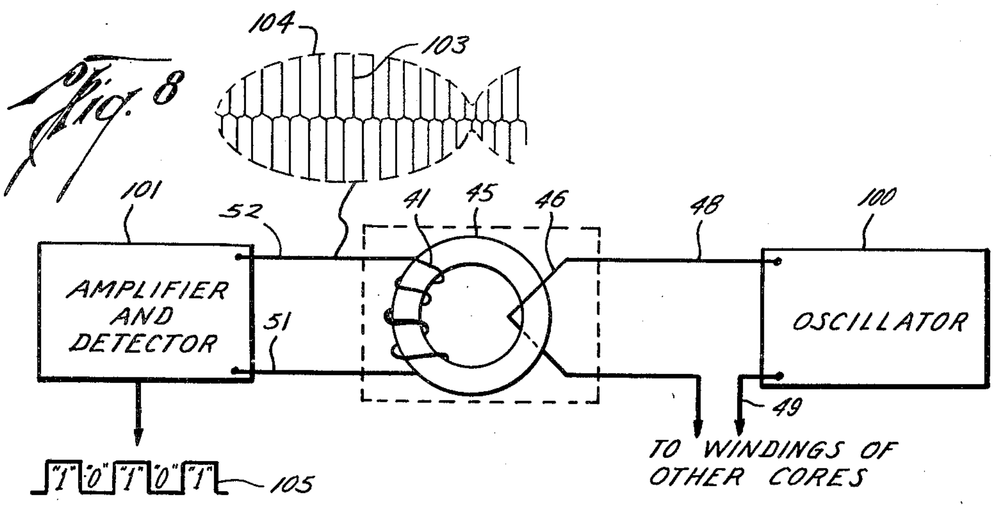
FIG. 8 is a schematic diagram of electrical networks which may be employed in conjunction with the encoder of FIG. 1.

As shown in FIG. 8, in the preferred operation of the encoder, the interrogate windings 46 are all connected in series and are energized by a single oscillator 100. The output signals 103 induced in the output winding 47, as a result of the switching of core 45 from one remanent state to the other, are first amplified, of necessity, and their envelope 104 is detected by an amplifier-detector 101, providing digit signals 105 to indicating apparatus or to computer systems. There is little restriction on the wave shape of the interrogate signal current. It may be a sine or a square wave. It may even be a pulsed current, as long as both positive and negative signal swings are present which leave the cores in their proper remanent state, good operation will be obtained. The operation of each toroid is as follows: on one hand, when the toroid 45 is adjacent to an unmagnetized area (black arc in FIG. 7), the alternating interrogate signal, when of sufficient amplitude, causes the toroid to alternately switch from one remanent state to the other along the "square loop" hysteresis curve. As each toroid switches, pulses of alternating polarity are generated in its output winding 47; on the other hand, when the core is adjacent to a magnetized area (dotted arcs in FIG. 7), the flux lines emanating from the magnetized area saturate both legs of the toroid, as can be clearly seen in the enlarged sectional view shown in FIG. 6. Because of flux field geometry, the left leg of the toroid is saturated in one direction while the right leg is saturated in the opposite direction. Consequently, the flux created during each one-half cycle by the interrogate signal will aid saturation in one leg of the toroid and buck saturation in the other leg. Hence, during the process of interrogation, the core is alternately saturated in one side, then in the other. But, as long as some part of the toroid is saturated, regardless of which side it may be, no output signal is generated in the read winding 47. The frequency of the interrogate signal is not critical, values of 20 kc. to 200 kc. have been successfully used; a 500 milli-ampere-turns is generally required for proper switching of the toroids. Approximately 20 milliwatts of input power is consumed by each core.

It will be appreciated that a readout may be obtained regardless of whether the coded disk is stationary or moving. Furthermore, when the disk is moving, its flux field sweeps across the reading head in such a manner that equal and opposite flux lines are induced in each leg of the toroid, causing a net flux density around the toroid of zero. Hence, no E.M.F., or spurious signals, will be generated in the windings on the toroid as a result of relative motion between the cores and the disks and, therefore, only negligible loading is added to the disks.

As an alternative to operating the encoder with a continuous interrogate signal, it may also be interrogated with single cycle pulses applied to the interrogate windings and observing the resulting output pulses on the output windings. As in the case of a continuous interrogation, when the toroid is in a flux field and saturated, no output pulse will appear in the output winding 47. Inversely, when the toroid is not adjacent to a magnetized spot, an output pulse will be generated in the output winding. However, in this type of operation, a single cycle interrogate pulse must make a complete positive and negative excursion in order not to leave the toroids in the wrong remanent state for the next oncoming pulse. One-microsecond pulses have been used to successfully read the encoder.

Although the operation of the encoder has been described in conjunction with an input and an output winding on each core and the binary digits were obtained by detecting the presence or absence of a voltage on the output windings and thus providing on the ON and OFF signals of the code, it will be apparent that the encoder can equally be operated with only a single winding on each core and the binary digits would be obtained by monitoring the impedance of this single winding. Thus, when the reading head is not in a magnetic field, the interrogate signal applied to the single winding causes the toroids to switch alternately from one remanent state to the other and, during the transition between alternate states, the core becomes unsaturated for a short time interval (usually in the order of one microsecond) thereby highly increasing the impedance of the single winding on the core. Conversely, when the reading head is in a magnetic field of sufficient density, the core is always saturated and, therefore, the impedance of the single winding is very low. Typical output impedances when the core is outside of a saturating flux emanating from a magnetic spot are 50 to 100 ohms, and when the core is adjacent to a magnetic spot, the impedance is substantially zero. However, regardless of whether the voltage or the impedance is measured, a binary "0" is obtained when the toroid head is saturated by a magnetized spot adjacent thereto and a binary "1" is obtained when the toroid head is between two consecutive discrete magnetized areas on the disk. Consequently, it is the state of saturation of the miniature toroidal core which determines the output binary digit signals from each track. Hence, the magnetized spots, if properly spaced apart, can be of either polarity as long as they are of sufficient strength to substantially saturate the toroid when it is adjacent thereto. In sum, cable 53 carries, from the output of the encoder 10, thirteen parallel output channels, each providing simultaneously a digit signal corresponding to a discrete position of shafts 16 and 18.

Although the encoder 10 has been specifically described in conjunction with the cyclic code, it will be understood that a pure or standard binary code can also be employed. To avoid the inherent ambiguity existing in the readout of the pure binary code, more readout heads are usually provided. For example, the first, or least significant, track 71 on the first disk 31 would have a single core associated therewith, and the remaining tracks 72–77 and 81–86 on the respective disks 31 and 32 would each have two cores. The readout heads could be arranged in accordance with the "V" principle by which a single core is used on the finest or least significant track and two cores on all the remaining tracks. The paired cores on each successive track are spaced ±½, ±1, ±2, . . . units from a reading index line drawn through the center of the single core; the unit of measurement is taken as the length of a segment on the least significant track. Only one core at a time is read on each track. External logical circuits are employed to determine, for each track, which core is to be read. The reading of the least significant, or first track, determines whether the leading or lagging core will be read on the second track. Similarly, the reading of the second track determines whether the leading or lagging core will be read on the third track, and so on. Since the separation between each pair of cores doubles as one progresses from the least significant to the most significant track, the leading and the lagging cores cannot be conveniently mounted in groups on separate boards, such as boards 40–43 in FIG. 1, but each leading and each lagging core must be separately mounted in the encoder housing.

In the copending application Serial No. 89,853, filed February 16, 1961, by Howard M. Fleming, Jr., there is disclosed a readout technique allowing the mounting of the readout cores in groups on separate boards. In this copending application, there is described an encoder with two disks, the least significant track on the first disk having a single pickup core and each of the remaining tracks on each disk having a leading and a lagging core spaced apart. Each leading pickup core is separated from its corresponding lagging pickup core, on the same track, by a distance equal to a quantum of the least significant track. Logical networks are provided for selecting either all the leading or all the lagging pickup cores on the first disk depending upon the output of the single pickup core. Similarly, all the leading or all the lagging pickup cores on the second disk are selected in dependence upon the most significant output digit (from the last track) of the first disk. In accordance with this technique, a side view of the second disk 32 in combination with the corresponding cores would appear as shown in FIG. 3 wherein all the leading heads 80*b* on each face of the disk are radially aligned on one side of shaft 18, and all the lagging heads 80*c* are radially aligned on the other side of the shaft 18.

Having thus described my invention with particular reference to the preferred forms thereof and having shown and described certain modifications, it will be obvious to those skilled in the art to which the invention pertains, after understanding my invention, that various changes and other modifications may be made therein without departing from the spirit and scope of my invention, as defined by the claims appended hereto.

What is claimed is:

1. A digital encoder comprising in combination, a first rotatable magnetic disk having on each face thereof a binary pattern of coded tracks, a second rotatable magnetic disk having on at least one face thereof another binary pattern of coded tracks, each track delineating a number of discrete permanently magnetized areas defining magnetic flux concentrations of limited arcuate extent emanating from each face; each face being substantially unmagnetized intermediate said areas; a plurality of small reentrant core members, at least one for each track, each member composed of ferromagnetic material having opposite remanent states affording a single gapless magnetic circuit for sensing said magnetized areas; each of said flux concentrations being of sufficient intensity to substantially saturate said material when said core member is within the arcuate extent of a flux concentration; coupling means including a shaft for axially supporting and rotating each of said magnetic disks with the respective coded faces in closely spaced tangential relation to the periphery of each core member; and an excitation winding and a readout winding on each core member for transforming, except when said core member is opposite to one of said magnetized areas, an alternating current applied to said excitation winding into a train of output binary digit signals in said readout winding, induced by the switching of said core member between its opposite remanent states.

2. The encoder of claim 1 and further including a plurality of boards for carrying respective groups of said core members.

3. The encoder of claim 1 wherein each disk is of barium ferrite material.

4. The encoder of claim 1 further including nonmagnetic stainless steel bearings for rotatably supporting each of said shafts.

5. The encoder of claim 1 and further including a spur-gear speed reducer for coupling said shafts.

6. The encoder of claim 5 and further including a housing of non-magnetic material for shielding said disks.

7. A digital encoder comprising in combination, a first magnetic disk and a second magnetic disk, each disk having on each end face thereof a pattern of discrete permanently magnetized areas arranged concentrically with respect to the axis of said disk to form a binary code, each disk being substantially unmagnetized intermediate said areas, said areas each having a single magnetic polarity and being of limited arcuate extent to define concentrations of magnetic flux emanating from each face; a re-entrant toroidal core member for each concentric arrangement of areas in said pattern; each said core member being composed of ferromagnetic material having a substantially square hysteresis characteristic curve and saturable by each of said flux concentrations; coupling means supporting said first and said second disks for rotation of their respective faces in closely spaced tangential relation to the periphery of each of said core members; and an excitation and a readout winding on each of said core members for transforming an alternating current applied to said excitation winding into a train of output digital signals in said readout winding corresponding to the switching of said core member between opposite remanent states on said hysteresis curve, except when said core member is opposite one of said magnetized areas.

8. In a position-sensing apparatus, a first and a second rotatable disk each having on each face thereof a plurality of permanent magnetic flux-emanating areas arranged in a coded pattern, said pattern comprising groups of areas representative of distinct, predetermined positions, each disk being substantially unmagnetized intermediate said areas;

re-entrant core members mounted opposite to said first and second disks, each core member being composed, at least in part, of magnetic material having at least two remanent states, at least a portion of each of said core members being susceptible of becoming substantially saturated by respective ones of said flux-emanating areas dependent upon the relative positions of said core members and said flux-emanating areas;

said disks being susceptible of displacements relative to each other and relative to said core members whereby said core members are positioned with respect to certain of said areas dependent upon said relative displacements;

flux-inducing means coupled with each of said core members for switching the magnetic material of said core members between said remanent states dependent upon the relative positions of said core members and said disks;

and output means coupled with said flux-inducing means and responsive to the state of saturation in said core members for providing signals representative of said predetermined positions.

9. The position-sensing apparatus of claim 8 wherein said magnetized areas are arranged in spaced tracks, each track representing a distinct order of a digital code, and at least one core is mounted adjacent to each track, each core comprising a closed, magnetic circuit having a substantially higher magnetic permeability than the permeability of air.

10. The position-sensing apparatus of claim 8 wherein each disk is mounted on a shaft, said shafts are intercoupled by speed-changing means for imparting said relative displacements, and each shaft axially supports and rotates its disk member so that the disk's magnetized faces are in closely-spaced tangential relation to the periphery of each core member.

11. The apparatus of claim 10 wherein said flux-inducing means include at least one input winding on each of said core members, and said output means include at least one readout winding on each of said core members whereby said readout windings have relatively large amplitude signals induced therein in response to said cores' switching between their respective remanent states, except when said core members are opposite said flux-emanating areas.

References Cited by the Examiner

UNITED STATES PATENTS

| | | | |
|---|---|---|---|
| 2,740,110 | 3/56 | Trimble | 235—92 |
| 2,933,721 | 4/60 | Hagopian | 340—174.1 |
| 2,938,198 | 5/60 | Berman | 340—347 |
| 3,051,943 | 8/62 | Simon et al. | 340—347 |

OTHER REFERENCES

"Practical Analog-Digital Converters," by Klein et al., from "Instruments and Automation," June 1956, pages 1109–1116.

References Cited by the Applicant

UNITED STATES PATENTS

| | | |
|---|---|---|
| 2,575,342 | 11/51 | Gridley. |
| 2,765,459 | 10/56 | Winter. |
| 2,901,549 | 8/59 | Serrell. |
| 2,933,718 | 4/60 | Arsenault. |
| 2,938,199 | 5/60 | Berman. |
| 2,942,252 | 6/60 | Wolff. |

MALCOLM A. MORRISON, *Primary Examiner.*

IRVING L. SRAGOW, *Examiner.*